United States Patent
Onoe et al.

(10) Patent No.: US 10,344,655 B2
(45) Date of Patent: Jul. 9, 2019

(54) EXHAUST GAS PURIFICATION CATALYST

(71) Applicants: CATALER CORPORATION, Kakegawa-shi, Shizuoka (JP); TOYOTA JIDOSHA KABUSHIKI KAISHA, Toyota-shi, Aichi (JP)

(72) Inventors: Ryota Onoe, Kakegawa (JP); Shingo Sakagami, Kakegawa (JP); Tsuyoshi Ito, Kakegawa (JP); Yuta Morishita, Kakegawa (JP); Masahiko Takeuchi, Toyota (JP); Naoto Miyoshi, Toyota (JP); Akemi Sato, Toyota (JP); Daisuke Ochiai, Toyota (JP)

(73) Assignees: CATALER CORPORATION, Kakegawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/518,011

(22) PCT Filed: Oct. 7, 2015

(86) PCT No.: PCT/JP2015/078551
§ 371 (c)(1),
(2) Date: Apr. 10, 2017

(87) PCT Pub. No.: WO2016/060050
PCT Pub. Date: Apr. 21, 2016

(65) Prior Publication Data
US 2017/0298797 A1    Oct. 19, 2017

(30) Foreign Application Priority Data

Oct. 16, 2014 (JP) ................. 2014-211381

(51) Int. Cl.
*B01D 53/94* (2006.01)
*B01J 35/04* (2006.01)
(Continued)

(52) U.S. Cl.
CPC ............... *F01N 3/28* (2013.01); *B01D 53/94* (2013.01); *B01J 23/464* (2013.01); *B01J 35/04* (2013.01);
(Continued)

(58) Field of Classification Search
None
See application file for complete search history.

(56) References Cited

U.S. PATENT DOCUMENTS

2006/0057046 A1    3/2006  Punke et al.
2007/0224092 A1    9/2007  Miyairi et al.
(Continued)

FOREIGN PATENT DOCUMENTS

CN    102006922 A    4/2011
CN    102574075 A    7/2012
(Continued)

OTHER PUBLICATIONS

Mar. 1, 2018 Office Action issued in Japanese Patent Application No. 2016-554055.
(Continued)

*Primary Examiner* — Colin W. Slifka
(74) *Attorney, Agent, or Firm* — Oliff PLC (57) ABSTRACT

An exhaust gas purification catalyst having an excellent exhaust partition ability while reducing the increase in pressure loss. Exhaust gas purification catalyst includes a substrate having a wall-flow structure with partition wall, upstream coating section formed in portions of partition wall facing entrance cell, from exhaust inlet-side end in the extending direction of partition wall, and downstream coating section formed in portions of partition wall facing exit cell, from exhaust outlet-side end in the extending direction, having a length shorter than the entire length $L_w$ of the partition wall. In downstream coating section, a catalytic
(Continued)

metal is concentrated in the surface layer in contact with exit cell.

11 Claims, 4 Drawing Sheets

(51) Int. Cl.
*B01J 23/46* (2006.01)
*B01J 37/02* (2006.01)
*F01N 3/22* (2006.01)
*F01N 3/28* (2006.01)
*F01N 3/035* (2006.01)
*F01N 3/022* (2006.01)

(52) U.S. Cl.
CPC ........... *F01N 3/035* (2013.01); *F01N 3/2828* (2013.01); *B01D 2255/9155* (2013.01); *B01D 2255/9202* (2013.01); *F01N 3/0222* (2013.01); *F01N 2370/02* (2013.01); *F01N 2510/0682* (2013.01)

(56) References Cited

U.S. PATENT DOCUMENTS

| | | |
|---|---|---|
| 2009/0087365 A1 | 4/2009 | Klingmann et al. |
| 2010/0175372 A1 | 7/2010 | Lambert et al. |
| 2011/0030346 A1 | 2/2011 | Neubauer et al. |
| 2011/0078997 A1 | 4/2011 | Boorse et al. |
| 2011/0123421 A1 | 5/2011 | Grubert |
| 2012/0186212 A1 | 7/2012 | Tanaka et al. |
| 2012/0240558 A1 | 9/2012 | Inoue |
| 2012/0247092 A1 | 10/2012 | Boorse |
| 2013/0136662 A1 | 5/2013 | Choi et al. |
| 2014/0044626 A1 | 2/2014 | Greenwell |
| 2014/0134062 A1 | 5/2014 | Kwon |
| 2014/0311112 A1 | 10/2014 | Toyoshima et al. |
| 2015/0292387 A1 | 10/2015 | Nishioka et al. |
| 2017/0298797 A1 | 10/2017 | Onoe et al. |
| 2017/0304773 A1 | 10/2017 | Onoe et al. |

FOREIGN PATENT DOCUMENTS

| | | |
|---|---|---|
| CN | 102770629 A | 11/2012 |
| CN | 102959191 A | 3/2013 |
| CN | 103133093 A | 6/2013 |
| CN | 103458990 A | 12/2013 |
| CN | 103687661 A | 3/2014 |
| CN | 105793529 A | 7/2016 |
| EP | 2161420 A1 | 3/2010 |
| EP | 2781261 A1 | 9/2014 |
| EP | 2 873 817 A1 | 5/2015 |
| JP | 2007-185571 A | 7/2007 |
| JP | 2009-082915 A | 4/2009 |
| JP | 2010-269205 A | 12/2010 |
| JP | 2012-236180 A | 12/2012 |
| JP | 2013-500857 A | 1/2013 |
| JP | 2013-506787 A | 2/2013 |
| JP | 2013-511379 A | 4/2013 |
| WO | 2009/102683 A1 | 8/2009 |
| WO | 2011/041769 A2 | 4/2011 |
| WO | 2011/140248 A2 | 11/2011 |
| WO | 2012/135871 A1 | 10/2012 |
| WO | 2014/002772 A1 | 1/2014 |
| WO | 2014/076767 A1 | 5/2014 |
| WO | 2015/082892 A2 | 6/2015 |

OTHER PUBLICATIONS

Oct. 20, 2017 Extended Search Report issued in European Patent Application No. 15851481.0.
Oct. 12, 2017 Extended European Search Report issued in European Patent Application No. 15850544.6.
Apr. 30, 2018 Office Action issued in U.S. Appl. No. 15/517,990.
Sep. 4, 2018 Notice of Allowance issued in U.S. Appl. No. 15/517,990.
Sep. 12, 2018 Corrected Notice of Allowability issued in U.S. Appl. No. 15/517,990.
Dec. 14, 2018 Office Action issued in European Patent Application No. 15851481.0.
Mar. 25, 2019 Office Action issued in Chinese Patent Application No. 201580056001.0.
Mar. 25, 2019 Office Action issued in Chinese Patent Application No. 201580055950.7.

FIG.1

→ Extending direction (axial direction)

EXHAUST GAS PURIFICATION CATALYST

TECHNICAL FIELD

The present invention relates to an exhaust gas purification catalyst provided to an exhaust system of an internal combustion system. In particular, it relates to a wall-flow type exhaust gas purification catalyst.

The present application claims priority to Japanese Patent Application No. 2014-211381 filed on Oct. 16, 2014; the entire contents of which are incorporated herein by reference.

BACKGROUND ART

Exhaust gas emitted from an internal combustion system such as an automobile engine comprises toxic components such as particulate matter (PM), hydrocarbons (HC), carbon monoxide (CO), and nitrogen oxides ($NO_x$). Conventionally, a wall-flow type exhaust gas purification catalyst (wall-flow exhaust gas purification catalyst) is used to efficiently eliminate these exhaust components.

A wall-flow exhaust gas purification catalyst comprises entrance cells with open ends on the exhaust inlet side, exit cells with open ends on the exhaust outlet side, and porous partition walls (ribbed walls) to separate the two types of cells. The exhaust gas purification catalyst comprises a catalytic layer comprising a catalytic metal and a support that carries the catalytic metal. Exhaust gas emitted from the internal combustion system flows via the exhaust inlet-side ends into the entrance cells, passes through micro pores of the porous partition walls, and flows out of the exhaust outlet-side ends of the exit cells. When the exhaust is in contact with the catalytic layer (catalytic metal), the exhaust components are purified (detoxified).

Conventional art literature related to this includes Patent Documents 1 and 2. For instance, Patent Document 1 discloses an exhaust gas purification catalyst comprising catalytic layers in a two-layer configuration. In particular, it discloses an exhaust gas purification catalyst comprising a Pd-containing catalytic layer throughout the interior of its partition walls and further comprising another Rh-containing catalytic layer on the surface of its partition walls in contact with the entrance cells to completely cover the first catalytic layer.

CITATION LIST

Patent Literature

[Patent Document 1] Japanese Patent Application Publication No. 2009-82915
[Patent Document 2] Japanese Patent Application Publication No. 2007-185571

SUMMARY OF INVENTION

According to the studies by the present inventors, however, there has been some room for improvement with respect to the location of the catalytic metal in the exhaust gas purification catalyst. In other words, such an exhaust gas purification catalyst comprises the first catalytic layer throughout the interior of its partition walls and the second catalytic layer is formed entirely over the first catalytic layer. Like this, when the surface of entrance cells were covered with a catalytic layer, pressure loss may have increased excessively. Lately, economic vehicles with energy-saving systems such as hybrid engines and start-stop systems have gained popularity. In such economic vehicles, while at stops waiting for green signal and so on, the engines are started and stopped repetitively. Along with this, the exhaust temperature also rises and falls. Thus, there is a demand for an exhaust gas purification catalyst capable of producing excellent catalytic performance even in such a mode of use.

The present invention has been made in view of such circumstances with an objective to provide an exhaust gas purification catalyst with which the increase in pressure loss is reduced while showing an excellent exhaust partition ability.

The present inventors have carried out earnest studies in various aspects and have come to create an invention capable of achieving the objective.

The exhaust gas purification catalyst according to this invention is of wall-flow type placed in an exhaust pipe of an internal combustion system such as an automobile engine to purify exhaust gas emitted from the internal combustion system. The exhaust gas purification catalyst comprises a substrate having a wall-flow structure (a wall-flow substrate), upstream coating sections, and downstream coating sections. The wall-flow substrate comprises entrance cells having open ends on the exhaust inlet side, exit cells having open ends on the exhaust outlet side, and porous partition walls to separate the entrance cells and the exit cells. The upstream coating sections are formed in the interior of the partition walls facing (in contact with) the entrance cells; they are formed from the exhaust inlet-side ends in the extending direction of the partition walls, with the coating sections comprising a catalytic metal and a support carrying the catalytic metal. The downstream coating sections are formed in the partition walls facing the exit cells; they are formed from the exhaust outlet-side ends in the extending direction, having a length shorter than the entire length $L_w$ of the partition walls (i.e. the entire length of the substrate here). The downstream coating sections comprise a catalytic metal and a support carrying the catalytic metal. In the downstream coating sections, the catalytic metal is concentrated in the surface layer in contact with the exit cells.

The downstream coating sections are formed in the partition walls facing the exit cells; it is formed from the exhaust outlet-side ends in the extending direction, having a length less than the entire length $L_w$ of the partition walls, with the coating section comprising a catalytic metal and a support carrying the catalytic metal. In the downstream coating section, the catalytic metal is concentrated in the surface layer in contact with the exit cells.

Upon entering the entrance cells, the exhaust passes through the interior of the partition walls (through the interior of micro pores of the partition walls). Thus, with the upstream coating sections provided to the interior of the partition walls, exhaust gas can be effectively purified while passing through the partition walls. In addition, after passing through the partition walls, the exhaust gas often flows linearly towards the exhaust outlet-side ends of the exit cells. Thus, in the downstream coating sections, with the catalytic metal concentrated in the surface area in contact with the exit cells, it is allowed to make proper contact with the exhaust gas flowing straight through the exit cells. As a result, the partition performance can be maintained or increased. In addition, the increase in pressure loss can be reduced with the upstream coating sections provided to the interior of the partition walls and the downstream coating sections provided with the length $L_D$ in the extending direction shorter than the entire partition wall length $L_w$.

Thus, this configuration can reduce the increase in pressure loss while increasing the exhaust partition performance.

In this description, the condition that a coating section is "formed in the interior of partition walls" means that most of the coating section is present (concentrated) in the interior of the partition walls. For example, it means the following: when the upstream coating section is observed in a cross section under an electron microscope, with the total amount of the catalytic metal over a length of $0.1L_w$ in the extending direction from the exhaust inlet-side ends being 100% by mass, the catalytic metal content present inside the partition walls is, but not particularly limited to, 80% by mass or greater, for instance, 90% by mass or greater, or preferably 95% by mass or greater. Thus, it is clearly distinct from an embodiment where, for instance, as a result of forming a coating section on the exterior (typically on the surface) of partition walls, part of the coating section is integrated inadvertently into the partition walls.

In this description, in the downstream coating sections, the presence of the catalytic metal concentrated in the surface layer in contact with the exit cells means that most of the catalytic metal in the downstream coating sections is present (concentrated) in areas in contact with the exit cells. In an example, with the overall downstream coating section thickness (i.e. the overall thickness of a downstream coating section) being $T_D$, about 80% or more of the total amount of the catalytic metal in the downstream coating sections is contained in portions up to $0.5T_D$ deep from the surface of the exit cells, typically up to $0.3T_D$ deep, for example, up to $0.2T_D$ deep, and especially up to $0.1T_D$ deep.

In a preferable embodiment of the exhaust gas purification catalyst disclosed herein, the downstream coating sections are divided into two subsections in thickness direction vertical to the extending direction, namely the first downstream coating subsections relatively close to the entrance cells and the second downstream coating subsections relatively close to the exit cells. The first downstream coating subsections are essentially free of the catalytic metal. The second downstream coating subsections comprise the catalytic metal. Maximum performance can be obtained from the catalytic metal when the downstream coating sections are clearly divided into two subsections in terms of catalytic metal-carrying rate, with the catalytic metal concentrated in the second downstream coating subsections in contact with the exit cells. As a result, the frequency of contacts between the catalytic metal and exhaust can be suitably increased, whereby emissions can be reduced to a greater extent.

In this description, being essentially free of a catalytic metal means that the catalytic metal is not intentionally mixed in when the first downstream coating subsections are formed. Thus, for instance, unintentional catalytic metal contamination from other sections (subsections) can be allowed while other coating sections (subsections) are being formed or while the exhaust gas purification catalyst is in use. Needless to say, the presence of inevitable minor components is acceptable. While there are no particular limitations, it means that, for instance, with the total amount of catalytic metal in the downstream coating sections being 100% by mass, the amount of the catalytic metal in the first downstream coating subsections is cut down to about 5% by mass or less, for example, 1% by mass or less, or especially 0.1% by mass or less.

In a preferable embodiment of the exhaust gas purification catalyst disclosed herein, the length $L_D$ of the downstream coating sections in the extending direction is 10% or greater, but 50% or less of the length $L_w$. By this, while the partition performance against straight flow exhaust is maintained at an excellent level, the increase in pressure loss can be favorably reduced.

In a preferable embodiment of the exhaust gas purification catalyst disclosed herein, the length $L_U$ of the upstream coating sections in the extending direction is 60% or greater, but 90% or less of the length $L_w$. That is, the upstream coating sections are formed in the interior of the partition walls facing the entrance cells; they are formed from the exhaust inlet-side ends in the extending direction of the partition walls, having a length shorter than the entire partition wall length $L_w$. With $L_U$ being 60% or more of $L_w$, the frequency of contacts between the catalytic metal and exhaust passing through the partition walls can be increased, whereby higher exhaust partition performance can be obtained. With $L_U$ being 90% or less of $L_w$, the increase in pressure loss can be favorably reduced.

In a preferable embodiment of the exhaust gas purification catalyst disclosed herein, in the extending direction, the upstream and downstream coating sections are configured to partially overlap each other in the extending direction in a way that $L_U$ and $L_D$ satisfy the next inequality $L_w<(L_U+L_D)<2L_w$. The two catalytic metal-containing sections (upstream and downstream coating sections) overlapping in the extending direction are able to more suitably purify exhaust components, allowing for reduction of emissions to a greater extent. Accordingly, the exhaust gas purification catalyst can be obtained with a greater exhaust partition ability.

The length over which the upstream and downstream coating sections overlap each other is preferably 5% or greater, but 20% or less of the length $L_w$. This can bring about a yet higher level of exhaust partition ability. It can also inhibit an excess increase in pressure loss.

In a preferable embodiment of the exhaust gas purification catalyst disclosed herein, in thickness direction vertical to the extending direction, with the overall partition wall thickness (i.e. the overall thickness of a partition wall) being $T_w$, the downstream coating sections are formed to a thickness $T_D$ equivalent to 30% or less of the thickness $T_w$ in the partition walls. This allows for more effective use of the catalytic metal.

In a preferable embodiment of the exhaust gas purification catalyst disclosed herein, in thickness direction vertical to the extending direction, with the overall partition wall thickness being $T_w$, the upstream coating sections are formed to a thickness $T_U$ equivalent to 70% or more of the thickness $T_w$ in the interior of the partition walls. With the catalytic metal dispersed through a large part, while the increase in pressure loss is favorably reduced, high exhaust partition performance can be obtained.

DESCRIPTION OF EMBODIMENTS

Some preferred embodiments of the present invention are described below with reference to drawings. In the drawings below, a common reference numeral may be assigned to members or sites producing the same effects, and duplicated descriptions are sometimes omitted or simplified. Dimensional relationships (length, width, thickness, etc.) in the respective drawings do not necessarily represent the accurate dimensional relationships. Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field.

The exhaust gas purification catalyst disclosed herein generally comprises a substrate having a wall-flow structure, and two coating sections (upstream and downstream coating sections) provided to the partition walls of the substrate. The exhaust gas purification catalyst disclosed herein is characterized by that, in the downstream coating section, the catalytic metal is concentrated in the surface layer in contact with the exit cells. Thus, there are no particular limitations to other features. With suitable selection of the substrate, support, catalytic metal and so on, the exhaust gas purification catalyst of the present invention can be made in a desirable shape in accordance with the application.

Figure 1:
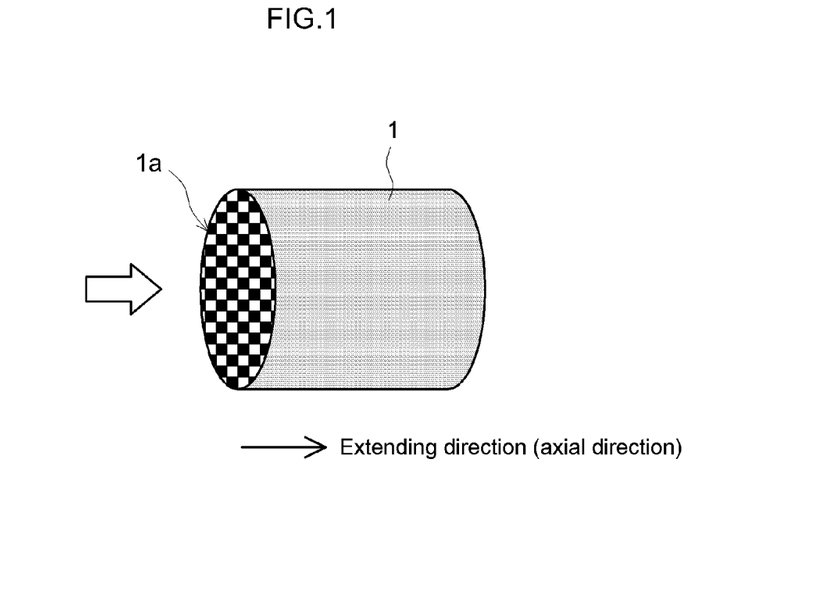
FIG. 1 shows a perspective diagram schematically illustrating the substrate for the exhaust gas purification catalyst according to an embodiment of the present invention.
Figure 2:
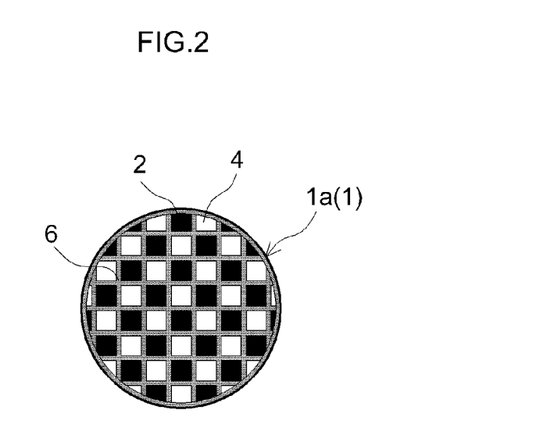
FIG. 2 shows a cross-sectional diagram schematically illustrating an end of the honeycomb substrate in FIG. 1.

The substrate having a wall-flow structure is first described. The substrate constitutes the frame of the exhaust gas purification catalyst disclosed herein. For the substrate, a species that is conventionally used for this type of application can be suitably selected. FIG. 1 shows a schematic diagram illustrating an example of the substrate. The substrate shown in FIG. 1 is a honeycomb substrate (honeycomb structure) 1 having a cylindrical outer shape. Honeycomb substrate 1 has several cells regularly arranged in the extending direction of honeycomb substrate 1 (in the axial direction of the cylindrical shape) and partition walls that separate the cells. With respect to adjacent cells, their open ends on the two opposite sides (inlet and outlet sides) in the extending direction are alternately closed. FIG. 2 shows a schematic diagram illustrating an end 1a of honeycomb substrate 1 in a cross section. In this embodiment, the end 1a has an approximately circular shape. At the end 1a, plugs 2 and cell openings 4 are arranged in a checkerboard pattern. Between the plugs 2 and cell openings 4, porous partition walls 6 are placed.

For instance, honeycomb substrate 1 is suitably formed from a heat-resistant material so as to be effective even when it is exposed to a high temperature (e.g. 400° C. or higher) occurring when the internal combustion system is run under high pressure or when PM components are eliminated by combustion at a high temperature. Examples of the heat-resistant material include ceramic such as cordierite, aluminum titanate and silicon carbide (SiC), and alloys such as stainless steel. Honeycomb substrate 1 has a capacity (a total cell volume) of usually 0.1 L or greater, or preferably 0.5 L or greater; for instance, it is suitably 5 L or less, preferably 3 L or less, or more preferably 2 L or less. The overall length (i.e. the entire length $L_w$ across partition walls 6 in the extending direction (the running length $L_w$ of partition walls 6)) is usually suitably 10 mm to 500 mm, for instance, about 50 mm to 300 mm. From the standpoint of increasing the exhaust partition ability and the mechanical strength as well as of reducing the pressure loss, etc., the thickness of partition walls 6 (their length in the direction vertical to the extending direction) is, for instance, suitably about 0.05 mm to 2 mm. From the standpoint of increasing the mechanical strength and reducing the pressure loss, etc., the porosity of partition walls 6 is usually suitably around 40% to 70%. From the standpoint of increasing the PM-collecting ability and reducing the pressure loss, the average pore diameter of partition walls 6 is usually suitably about 10 µm to 40 µm. Instead of the cylindrical shape as shown in FIG. 1, the overall outer shape of honeycomb substrate 1 can be, for instance, elliptical cylindrical, polygonal cylindrical, etc.

Described next is an exhaust gas purification catalyst formed with honeycomb substrate 1.

Figure 3:
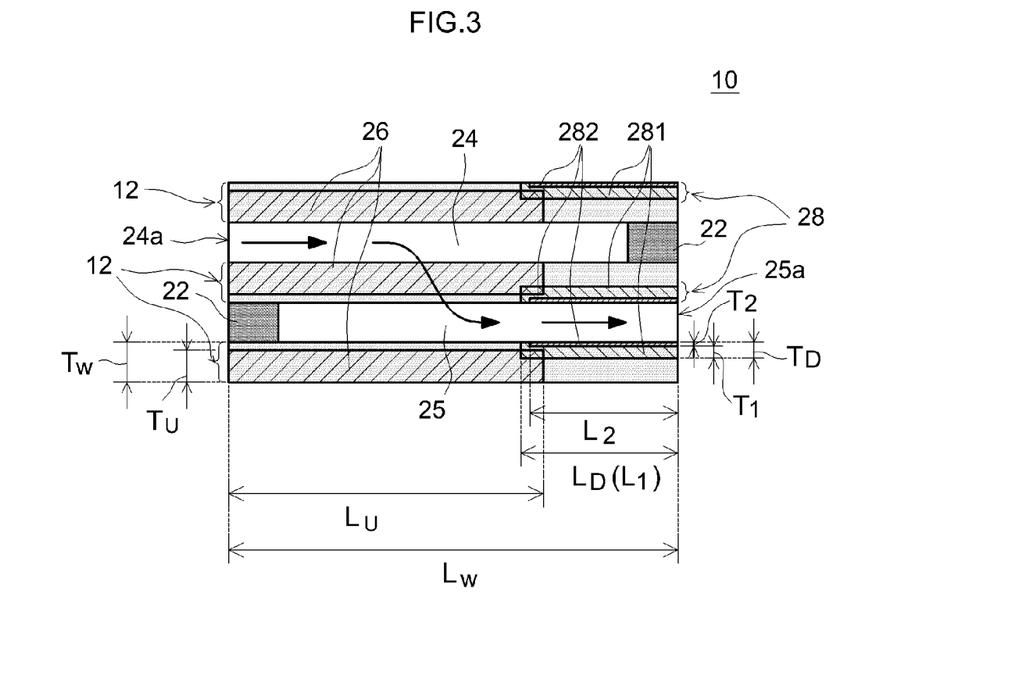
FIG. 3 shows an enlarged cross-sectional diagram schematically illustrating the construction of the exhaust gas purification catalyst in the vicinity of some partition walls according to an embodiment of the present invention.

FIG. 3 shows an enlarged cross-sectional diagram schematically illustrating the construction of exhaust gas purification catalyst 10 in the vicinity of some partition walls according to an embodiment of the present invention. In this diagram, the direction of the arrow indicates the direction of the exhaust flow. That is, the upstream of the exhaust channel (exhaust pipe) is on the left in FIG. 3; the downstream of the exhaust channel is on the right in FIG. 3. Exhaust gas purification catalyst 10 has a so-called wall-flow structure. Exhaust gas purification catalyst 10 comprises entrance cells 24 (in a U shape (sideway)) having open ends 24a on the exhaust inlet side, their adjacent exit cells 25 (in a U shape (sideway)) having open ends 25a on the exhaust outlet side, and porous partition walls 12 to separate the two types of cells. Plugs 22 are placed and sealed in the exhaust outlet-side ends 25a of the entrance cells 24 and exhaust inlet-side ends 24a of the exhaust exit cells 25, respectively.

As for places where exhaust is purified, exhaust gas purification catalyst 10 comprises two kinds of coating sections, namely upstream coating sections 26 and downstream coating sections 28. Upstream coating sections 26 are formed in the interior of partition walls 12 (specifically, in micro pores of partition walls 12) facing entrance cells 24. In particular, upstream coating sections 26 are formed with a prescribed length from exhaust inlet-side ends 24a in the extending direction of partition walls 12. Downstream coating sections 28 are formed in the interior of partition walls 12 (specifically in micro pores of partition walls 12) facing exit cells 25. In particular, downstream coating sections 28 are formed with a prescribed length from exhaust outlet-side ends 25a in the extending direction of partition walls 12. Upstream coating sections 26 and downstream coating sections 28 individually comprise catalytic metal particles serving as oxidation and/or reduction catalyst(s), and a support that carries the catalytic metal particles.

In exhaust gas purification catalyst 10 in such an embodiment, the exhaust emitted from the internal combustion system flows via exhaust inlet-side ends 24a into entrance cells 24, passes through micro pores of porous partition walls 12, and flows out of exhaust outlet-side ends 25a of exit cells 25. While passing through exhaust gas purification catalyst 10, toxic components of the exhaust come in contact with the catalytic metal (in upstream coating sections 26 and/or downstream coating sections 28) and are thereby purified (detoxified). For instance, HC and CO in the exhaust gas are oxidized by the catalytic activities of the catalytic metal(s) and converted (purified) to water ($H_2O$), carbon dioxide ($CO_2$), etc.; $NO_x$ is reduced by the catalytic activities of the catalytic metal(s) and converted (purified) to nitrogen ($N_2$). PM is less likely to pass through micro pores of partition walls 12; and therefore, it generally accumulates on partition walls 12 in entrance cells 24. The accumulated PM is decomposed and removed by the catalytic activities of the catalytic metal(s) or by combustion at a certain temperature (e.g. around 500° C. to 700° C.).

As for the catalytic metal, various metal species capable of serving as oxidation catalysts or reduction catalysts can be considered. Typical examples include precious metals such as rhodium (Rh), palladium (Pd) and platinum (Pt) of the platinum group. Alternatively, ruthenium (Ru), osmium (Os), iridium (Ir), silver (Ag), gold (Au) and the like can be used as well. An alloy of two or more species among these metals can also be used. Other possible metal species include alkali metals, alkaline earth metals and transition metals. From the standpoint of increasing the contact area with exhaust gas, the catalytic metal is preferably used as fine particles having sufficiently small particle diameters. The catalytic metal particles preferably have an average particle diameter (the average value of particle diameters determined by transmission electron microscopy; the same applies hereinafter) of usually about 1 nm to 15 nm; it is suitably 10 nm or smaller, 7 nm or smaller, or even 5 nm or smaller.

The support that carries the catalytic metal can be an inorganic compound conventionally used with exhaust gas purification catalysts of this type. In particular, it is preferable to use a porous support having a relatively large specific surface area (which refers to the specific surface area measured by a BET method here; the same applies hereinafter). Favorable examples include alumina ($Al_2O_3$), ceria ($CeO_2$), zirconia ($ZrO_2$), silica ($SiO_2$), titania ($TiO_2$), a solid solution of these (e.g. ceria-zirconia composite oxide (CZ composite oxide)) and a combination of these. From the standpoint of the heat resistance and structural stability, the support particles (e.g. alumina powder, CZ composite oxide powder) suitably have a specific surface area of 10 $m^2$/g to 500 $m^2$/g, for example, 200 $m^2$/g to 400 $m^2$/g. The support particles suitably have an average particle diameter of typically 1 nm to 500 nm, for example, 10 nm to 200 nm. The support species in the two coating sections (upstream and downstream coating sections 26 and 28) may be the same or different.

The metal species in upstream and downstream coating sections 26 and 28 can be the same or different. For example, a highly reducing metal species (e.g. rhodium) is used in one coating section and a highly oxidizing metal species (e.g. palladium and/or platinum) can be used in the other coating section. In a preferable embodiment, upstream coating sections 26 comprise at least Rh or an alloy of Rh and downstream coating sections 28 comprise at least Rh, Pd, Pt, or an alloy of these. Such an embodiment allows the catalytic metals to produce high levels of partition activity.

The catalytic metal-carrying rates of upstream and downstream coating sections 26 and 28 can be the same or different. The rates of catalytic metals carried in the upstream and downstream coating sections 26 and 28 (their catalytic metal contents with the support being 100% by mass) may also vary in accordance with, for instance, the lengths and thicknesses of the coating sections; and therefore, they are not particularly limited. It is generally suitable that they are individually 1.5% by mass or lower, preferably 0.05% to 1.5% by mass, or more preferably 0.2% to 1% by mass. When their catalytic metal-carrying rates are at or above certain values, it is easier to obtain the exhaust partition effects of the catalytic metals. When their catalytic metal-carrying rates are at or below certain values, progress in growth of particles (sintering) of the metals can be inhibited and the increase in pressure loss can be reduced. It is also advantageous in view of the cost.

In the art disclosed herein, in downstream coating sections 28, the catalytic metal is concentrated in the surface layers in contact with exit cells 25. In other words, in downstream coating sections 28, the catalytic metal-carrying rate varies in the thickness direction, with the rate being higher near exit cells 25. That is, in downstream coating sections 28, the concentration of catalytic metal carried varies in the thickness direction, with it being relatively high in areas in contact with exit cells 25. In wall-flow exhaust gas purification catalyst 10, once exhaust passes through partition walls 12, it rarely flows in the reverse direction to pass through partition walls 12 again. In other words, after having passed through partition walls 12, most of the exhaust moves straight towards ends 25a of exit cells 25. Thus, when the catalytic metal is concentrated in the areas in contact with exit cells 25, the exhaust moving straight through exit cells 25 after having passed through partition walls 12 (i.e. straight flow exhaust) can be efficiently purified.

In the thickness direction of downstream coating sections 28, portions relatively close to entrance cells 24 (i.e. portions away from exit cells 25) may or may not comprise the catalytic metal.

In a favorable embodiment, in the thickness direction, downstream coating sections 25 are divided into roughly two subsections. For instance, in the embodiment shown in FIG. 3, downstream coating sections 25 are formed of the first downstream coating subsections 281 relatively close to entrance cells 24 (further away from exit cells 25) and the second downstream coating subsections 282 relatively close to exit cells 25 (in contact with exit cells 25). The first downstream coating subsections 281 are essentially free of the catalytic metal. The second downstream coating subsections 282 comprise the catalytic metal. The effects of the present invention can be obtained to a higher level when the catalytic metal is concentrated (carried at a high rate) in the second downstream coating subsections 282 in contact with exit cells 25. For instance, when the catalytic metal is concentrated in the second downstream coating subsections 282 in a similar amount to a conventional product, relatively high partition performance can be obtained. Alternatively, when the catalytic metal is carried in the second downstream coating subsections 282 at a similar rate to a conventional product, the usage of the catalytic metal can be reduced while maintaining the partition ability. This is preferable from the standpoint of the cost reduction and energy saving.

In a preferable embodiment, in comparison between the upstream coating sections 26 and the second downstream coating subsections 282, the upstream coating sections 26 are relatively low and the second downstream coating subsections 282 are relatively high in catalytic metal-carrying rate. In other words, it is preferable that in upstream coating sections 26, a catalytic metal is provided at a relatively low catalytic metal-carrying rate (at a low density) to a large part while in the second downstream coating subsections 282, a catalytic metal is provided in a concentrated manner at a relatively high catalytic metal-carrying rate (at a high density). This can effectively reduce the pressure loss while maintaining the exhaust partition performance at a high level.

The catalytic metal-carrying rate is suitably more or less constant in the thickness direction of upstream coating sections 26.

Upstream coating sections 26 are formed in portions in the interior of partition walls 12 facing entrance cells 24; they are formed from exhaust inlet-side ends 24a in the extending direction, having a prescribed length. Upon entering entrance cells 24, the exhaust passes through the interior of partition walls 12. Thus, with upstream coating sections 26 provided to the interior of partition walls 12, the exhaust partition performance during passage through partition walls 12 can be effectively increased. According to the studies by the present inventors, such an embodiment is particularly effective also in view of reducing the pressure loss that occurs when exhaust gas flows in.

The length (average length) $L_U$ of upstream coating sections 26 in their extending direction is not particularly limited. It is usually preferably less than the entire length $L_w$ of partition walls 12. For instance, it is 30% or more of $L_w$, typically 50% or greater, for example, 60% or greater, or preferably 70% or greater; it is generally suitably 99% or less, typically 95% or less, for example, 90% or less, especially favorably 80% or less. In the embodiment shown in FIG. 3, the length $L_U$ of upstream coating sections 26 is about 70% of the length $L_w$. When a large part of partition walls 12 is coated with the catalytic metal, the chances for exhaust gas and the catalytic metal to come in contact can be increased, whereby high partition performance can be obtained. According to the studies by the present inventors, the vicinity of plugs 22 of entrance cells 24 tends to easily accumulate ash formed of nonflammable components. Thus, depending on the exhaust components, the pressure loss my increase in areas where the ash has accumulated, making the exhaust flow sluggish. With $L_U$ at or below a certain value (i.e. by placing upstream coating sections 26 outside the vicinity of the plugs 22), the increase in pressure loss can be favorably reduced. With $L_U$ at or above a certain value, more favorable exhaust partition performance can be obtained.

The thickness (average thickness) $T_U$ of upstream coating sections 26 may vary depending on, for instance, the thickness $T_w$ and length $L_U$ in the extending direction of partition walls 26, etc.; and therefore, it is not particularly limited. In typical, it is generally 30% or more of $T_w$, typically 40% or greater, for example, 50% or greater, preferably 60% or greater, more preferably 70% or greater, or especially favorably 80% or greater. For instance, it can be formed across almost the entirety (>98%) of partition walls 12 in their thickness direction. The upstream coating sections 26 present in a large part of partition walls can reduce the pressure loss while increasing the frequency of their contacts with wall-flow exhaust (i.e. exhaust passing through walls), whereby a high exhaust partition ability can be obtained.

Downstream coating sections 28 are formed in portions of partition walls 12 facing exit cells 25; they are formed from exhaust outlet-side ends 25a in the extending direction, having a length $L_D$ shorter than the entire length $L_w$ of partition walls 12. This can reduce the pressure loss while bringing about high exhaust partition performance. In other words, after passing through partition walls 12, the exhaust gas often flows through exit cells 25, linearly towards ends 25a. With the downstream coating sections 28 provided to partition walls 12 facing exit cells 25, the frequency of their contacts with straight flow exhaust can be increased, whereby components of the straight flow exhaust after passing through partition walls 12 can be properly purified.

The length (average length) $L_D$ of downstream coating sections 28 in the extending direction is generally 10% or more of the length $L_w$, typically 15% or more, for example, 20% or more, or preferably 30% or more; it is typically 50% or less or suitably, for example, 40% or less. In the embodiment shown in FIG. 3, the length $L_D$ of downstream coating sections 28 is about 35% of the length $L_w$.

When downstream coating sections 28 are formed of catalytic metal-free subsections (the first downstream coating subsections 281) and catalytic metal-containing subsections (the second downstream coating subsections 282), the length $L_1$ of the first downstream coating subsections 281 is generally 10% or more of $L_w$, typically 15% or more, for example, 20% or more, or preferably 30% or more; it is typically 50% or less, or suitably, for example, 40% or less. The length $L_2$ of the second downstream coating subsections 282 can be the same as or different from the length $L_1$. The length $L_2$ of the second downstream coating subsections 282 is generally 50% or more of $L_1$, typically 70% or more, for example, 90% or more; it is generally 120% or less, typically 110% or less, or suitably, for example, 100% or less. When $L_1$ and $L_2$ are different, for instance, the longer one is considered as $L_D$. In the embodiment shown in FIG. 3, $L_1$ is about 35% of $L_w$ and $L_2$ is 33% of $L_w$, with $L_1$ being a little larger. Thus, it can be presumed to be $L_1 \approx L_2$.

The thickness (average thickness) $T_D$ of downstream coating sections 28 may vary depending on, for instance, the overall thickness $T_w$ of partition walls 12 as well as the length $L_D$ in the extending direction; and therefore, it is not particularly limited. In typical, to avoid contacts with entrance cells 24, it is suitably less than 100% of the thickness $T_w$, generally 50% or less, typically 40% or less, for example, 30% or less. In the embodiment shown in FIG. 3, the thickness $T_D$ of downstream coating sections 28 is about 30% of $T_w$.

When downstream coating sections 28 are formed of catalytic metal-free subsections (the first downstream coating subsections 281) and catalytic metal-containing subsections (the second downstream coating subsections 282), the thickness $T_1$ of the first downstream coating subsections 281 is generally 50% or less of $T_w$, or typically 40% or less, for example, suitably 30% or less. The thickness $T_2$ of the second downstream coating subsections 282 is generally 40% or less of $T_w$, typically 30% or less, for example, suitably 20% or less. In the embodiment shown in FIG. 3, the thickness $T_1$ of the first downstream coating subsections 281 is about 20% of $T_w$ and the thickness $T_2$ of the second downstream coating subsections 282 is about 10% of $T_w$. The partition abilities of the catalytic metals are fully displayed with $T_2$ being less than $T_1$ and the catalytic metal concentrated in the vicinity of the surface of exit cells 25 (in the surface layers in the thickness direction thereof). When downstream coating sections 28 comprise several subsections in the thickness direction, the total thickness of the respective layers can be seen as $T_D$. In the embodiment shown in FIG. 3, $T_1$ is considered to be about 20% of $T_w$, $T_2$ about 10% of $T_w$, and $T_D$ about 30% of $T_w$.

In a preferable embodiment, the entire length $L_w$ of partition walls 12, the length $L_U$ of upstream coating sections 26 and the length $L_D$ of downstream coating sections 28 satisfy the next inequality $L_w < (L_U + L_D) < 2L_w$. In other words, in the extending direction of partition walls 12, upstream coating sections 26 partially overlap downstream coating sections 28. This can increase the frequency of contacts between exhaust components and the catalytic metal, whereby emissions can be further reduced.

When downstream coating sections 28 are formed of catalytic metal-free subsections (the first downstream coating subsections 281) and catalytic metal-containing subsections (the second downstream coating subsections 282), it is more preferable that the length $L_U$ of upstream coating sections 26 and the length $L_2$ of the second downstream coating subsections 282 satisfy the next inequality $L_w<(L_U+L_2)<2L_w$.

The overlapping length of upstream coating sections 26 and downstream coating sections 28 (or the second downstream coating subsections 282) in the extending direction is not particularly limited since it may vary depending on, for instance, the thicknesses of the respective coating sections (subsections) as well. Usually, it is about 2% or more of $L_w$, or typically 3% or more; it is generally about 20% or less, or typically 15% or less, for example, suitably 12% or less. In the embodiment shown in FIG. 3, the length $L_U$ of upstream coating sections 26 is about 70% of $L_w$ and the length $L_D$ of downstream coating sections 28 is about 35% of $L_w$, whereby they overlap each other in the extending direction by about 5%. In addition, the length $L_2$ of the second downstream coating subsections 282 is about 33% of $L_w$ so that it overlaps the length $L_U$ of the upstream coating sections 26 by about 3% in the extending direction.

When downstream coating sections 28 are formed of catalytic metal-free subsections (the first downstream coating subsections 281) and catalytic metal-containing subsections (the second downstream coating subsections 282), it is preferable that the thickness $T_U$ of upstream coating sections 26 and the thickness $T_2$ of the second downstream coating subsections satisfy the next inequality $(T_U+T_2)<T_w$. In other words, upstream coating sections 26 and the second downstream coating subsections 282 are separated by gaps to avoid contacts in the thickness direction. Thus, in the thickness direction, sections formed of the substrate by itself are present between upstream coating sections and the second downstream coating subsections 282. This can inhibit sintering and alloying of the catalytic metals to a great extent, whereby the exhaust gas purification catalyst can be obtained with greater durability.

The gaps in the thickness direction between upstream coating sections 26 and downstream coating sections 28 (or the second downstream coating subsections 282) are suitably, for instance, each equivalent to 2% or more of $T_w$, or typically 5% or more, but generally 20% or less, or typically suitably 15% or less. In the embodiment shown in FIG. 3, the thickness $T_U$ of upstream coating sections 26 is about 80% of $T_w$ and the thickness $T_2$ of the second downstream coating subsections 282 is about 10% of $T_w$, leaving gaps equivalent to about 10% in the thickness direction.

Coating sections as described above (upstream and downstream coating sections) can be formed by methods similar to conventional methods.

For instance, the exhaust gas purification catalyst 10 in the embodiment shown in FIG. 3 can be formed as follows:

First, a honeycomb substrate 1 as shown in FIGS. 1 and 2 is obtained and upstream coating sections 26 are formed in the interior of the partition walls of honeycomb substrate 1. In particular, a slurry is prepared for forming upstream coating sections, with the slurry comprising a desirable catalytic metal (typically as a solution comprising the catalytic metal in an ionic form) and desirable support powder. The properties (viscosity, solid contents, etc.) of the slurry can be adjusted in view of the size of honeycomb substrate 1 used and the porosity of partition walls 12. The slurry is supplied via exhaust inlet-side ends 24a of honeycomb substrate 1 into entrance cells 24 to form, by an internal coating method, upstream coating sections 26 in micro pores of partition walls 12, with the coating sections 26 having desirable properties. The features (e.g. thickness and catalytic metal-carrying rate) of upstream coating sections 26 can be adjusted, for instance, by the properties of the slurry, its amount supplied and so on. Alternatively, adjustment can be made when the slurry is supplied, by applying pressure to exit cells 25 to create a pressure gradient between entrance cells 24 and exit cells 25 so as to prevent the slurry from overly seeping into partition walls 12.

Subsequently, downstream coating sections 28 are formed in the interior of the partition walls of honeycomb substrate 1.

In particular, the first slurry is prepared, comprising desirable support powder. The slurry is supplied via exhaust outlet-side ends 25a of honeycomb substrate 1 into exit cells 25 to form support coating sections having desirable properties in micro pores of partition walls 12. The features (e.g. thickness) of support coating sections can be adjusted, for instance, by the properties of the slurry, its amount supplied and so on.

The second slurry is then prepared, comprising a desirable catalytic metal (typically a solution containing the catalytic metal in an ionic form). By an immersion method where honeycomb substrate 1 is immersed from its exhaust outlet-side ends 25a into the slurry, the catalytic metal is carried partially in the support coating sections. The configuration and features (e.g. thickness and catalytic metal-carrying rate) of the second downstream coating subsections 282 can be adjusted, for instance, by the catalytic metal concentration and viscosity of the slurry as well as the conditions of the immersion. According to such a method, the catalytic metal can be concentrated in the surface layer (portions in contact with exit cells 25) of downstream coating sections 28. By this, the second downstream coating subsections 282 can be formed.

It is noted that according to this method, the remaining portions of the support coating sections excluding the second downstream coating subsections 282 are the first downstream coating subsections 281.

After the application of the slurries, honeycomb substrate 1 is dried and calcined at prescribed temperatures for prescribed time periods. By this, exhaust gas purification catalyst 10 as shown in FIG. 3 can be produced.

In addition to the catalytic metals and supports, the slurries can comprise optional additional components such as heretofore known oxygen absorbing/releasing material, binder and additives. Examples of the oxygen absorbing/releasing material include a CZ composite oxide as a support or a non-support. Examples of the binder include an alumina sol and a silica sol.

The exhaust gas purification catalyst disclosed herein can provide excellent exhaust partition performance with a reduced increase in pressure loss. Accordingly, it can be favorably placed in an exhaust system (exhaust pipe) of, for instance, a gasoline engine or a diesel engine of an automobile. It is particularly effective to apply the present invention to economic vehicles with energy-saving systems such as hybrid engines and start-stop systems.

An example is described below in relation to the present invention, but the present invention is not to be limited to the specific example.

EXAMPLE

As the substrate, was obtained a cordierite honeycomb substrate of 300 cpsi (cells per square inch) in the number of cells, 0.9 L in volume (referring to the total bulk volume including the volumes of cell channels), 105 mm in total length, 103 mm in outer diameter, 0.3 mm in partition wall thickness, 15 μm in average pore diameter and 59% in porosity.

Upstream Coating Sections were Formed First.

In particular, were mixed 40 g of $Al_2O_3$ powder (γ-$Al_2O_3$, 1 μm average particle diameter) as a support, an aqueous rhodium solution containing 0.5 g Rh, and a suitable amount of pure water. The resulting mixture was mixed with stirring, dried and calcined (500° C., 1 hour) to obtain Rh-carrying powder. With the Rh-carrying powder, were mixed a ceria-zirconia composite oxide solution to yield 60 g of CZ composite oxide upon calcination, and a suitable amount of pure water to prepare an upstream coating section-forming slurry. The slurry was supplied from the exhaust inlet-side ends of the honeycomb substrate into the entrance cells to give an Rh-carrying rate of 0.275 g per 100% by mass of support upon calcination and to form upstream coating sections (with length $L_U$ in the extending direction, equivalent to 70% of the entire partition wall length; thickness $T_U$, equivalent to 80% of the partition wall thickness) in micro pores of the partition walls facing the entrance cells.

Subsequently, Downstream Coating Sections were Formed.

In particular, first, 40 g of $Al_2O_3$ powder (γ-$Al_2O_3$, 1 μm average particle diameter) was mixed in a suitable amount of pure water to prepare a support powder slurry. The slurry was supplied via the exhaust outlet-side ends of the honeycomb substrate into the exit cells to form coating sections of the support by itself (with length $L_D$ in the extending direction, equivalent to 35% of the entire partition wall length; thickness $T_D$, equivalent to 30% of the overall partition wall thickness) in micro pores of the partition walls facing the exit cells.

A suitable amount of an aqueous platinum solution containing 1.2 g Pt was mixed with a suitable amount of pure water to prepare a catalytic metal slurry. The slurry was supplied from the exhaust outlet-side ends of the honeycomb substrate into the exit cells to give a Pt-carrying rate of 0.66 g per 100% by mass of support upon calcination, whereby the catalytic metal was supported thereon by the immersion method. There were formed the second downstream coating subsections (with length $L_2$ in the extending direction, equivalent to 33% of the entire partition wall length; thickness $T_2$, equivalent to 10% of the overall partition wall thickness) in micro pores and on the surface of the partition walls facing the exit cells. In this Example, the length $L_1$ of the first downstream coating subsections in the extending direction is 35% of the entire partition wall length and the thickness $T_1$ is 20% of the overall partition wall thickness.

The resultant was dried at 150° C. for one hour and then calcined at 500° C. for one hour to obtain an exhaust gas purification catalyst according to this Example.

COMPARATIVE EXAMPLE

Figure 7:
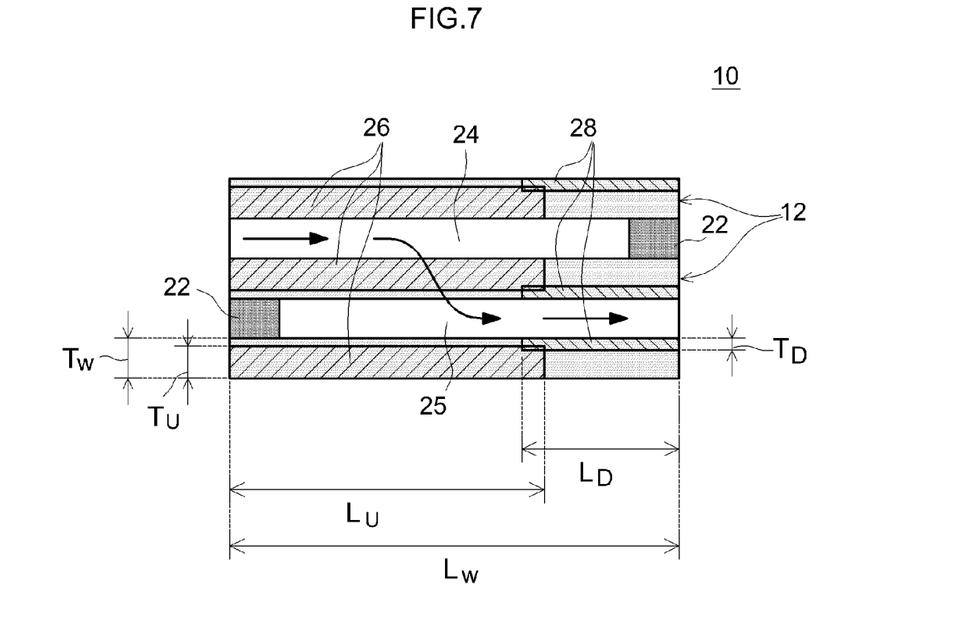
FIG. 7 shows an enlarged cross-sectional diagram schematically illustrating the construction of the exhaust gas purification catalyst in the vicinity of some partition walls according to Comparative Example.

The catalytic metal was carried throughout the entire downstream coating sections. Otherwise in the same manner as Example, an exhaust gas purification catalyst as shown in FIG. 7 was fabricated according to this Comparative Example. The reference signs in FIG. 7 are the same as in FIG. 3.

In the same manner as the Example, were formed upstream coating sections (with length $L_U$ in the extending direction, equivalent to 70% of the entire partition wall length; thickness $T_U$, equivalent to 80% of the overall partition wall thickness). Downstream coating sections were then formed. In particular, with a suitable amount of pure water, were mixed 40 g of $Al_2O_3$ powder (γ-$Al_2O_3$, 1 μm average particle diameter) as a support and a suitable amount of an aqueous platinum solution containing 1.2 g Pt. The resulting mixture was mixed with stirring, dried and calcined (500° C., 1 hour) to obtain Pt-carrying powder. With the Pt-carrying powder, was mixed a suitable amount of pure water to prepare a slurry for forming downstream coating sections. The slurry was supplied from the exhaust outlet-side ends of the honeycomb substrate into the exit cells to give a Pt-carrying rate of 0.66 g per 100% by mass of support upon calcination to form downstream coating sections (with length $L_D$ in the extending direction, equivalent to 35% of the entire partition wall length; thickness $T_D$, equivalent to 30% of the partition wall thickness) in micro pores of the partition walls facing the exit cells.

<Evaluation of Exhaust Partition Ability>

Figure 4:
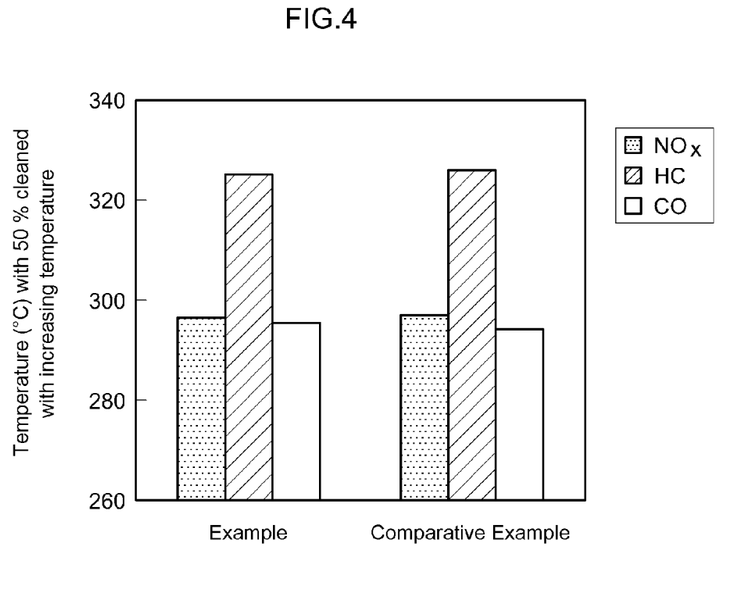
FIG. 4 shows a graph comparing exhaust partition abilities with increasing temperature.

The exhaust partition abilities of the resulting exhaust gas purification catalysts (Example, Comparative Example) were compared. Their partition abilities were compared first with increasing temperature. In particular, each exhaust gas purification catalyst was placed in a rig; while the temperature of the gas entering the catalyst was increased with a heat exchanger from 150° C. at a rate of 50° C./min, model exhaust gas was allowed to flow in and the concentrations of $NO_x$, HC (propylene here) and CO were measured at the exit of the catalyst; when the gas concentrations at the exit reached 50% by mole of the gas concentrations at the entrance, the temperature (temperature with 50% (of exhaust) purified) was evaluated. The results are shown in FIG. 4. It is noted that the lower the temperature with 50% purified is, the greater the partition ability is.

Figure 5:
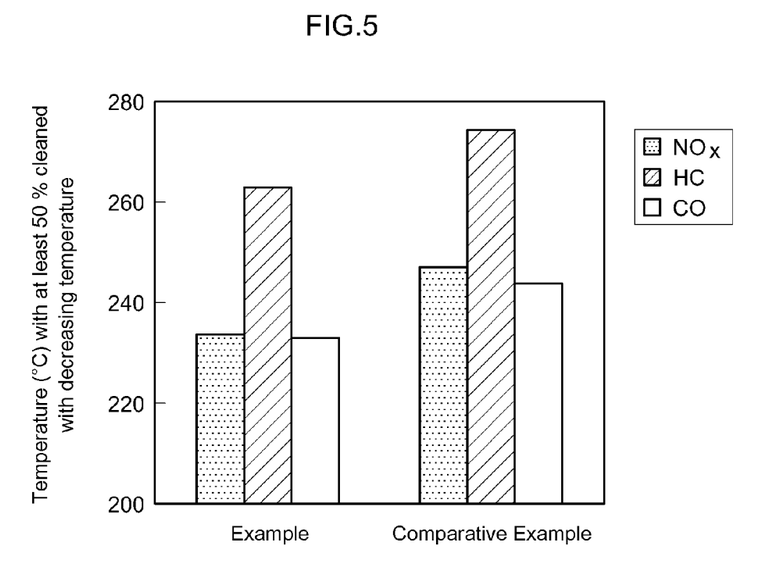
FIG. 5 shows a graph comparing exhaust partition abilities with decreasing temperature.

Their partition abilities were then compared with decreasing temperature. In particular, while the temperature of the gas entering the catalyst was decreased with a heat exchanger from 500° C. at a rate of 50° C./min, model exhaust gas was allowed to flow in and the concentrations of $NO_x$, HC (propylene here) and CO were measured at the exit of the catalyst; the temperatures at which the gas concentrations at the exit were kept at or above 50% by mole of the gas concentrations at the entrance were evaluated. The results are shown in FIG. 5. It is noted that the lower this temperature is, the greater also is the partition ability.

As shown in FIG. 4, with respect to the partition ability, no significant difference was found with increasing temperature between Example and Comparative Example. A reason for this may be that because the catalyst was heated from the upstream side when the temperature was raised, the upstream side of the catalyst made a greater contribution to the reactions.

On the other hand, as shown in FIG. 5, Example showed a higher partition ability than Comparative Example with decreasing temperature. A reason for this may be that because the catalyst was cooled from the upstream side when the temperature was decreased, the downstream side of the catalyst made a greater contribution to the reactions, bringing about significant effects of the catalytic metal concentrated in the surface layer in contact with the exit cells.

<Evaluation of Pressure Loss>

Figure 6:
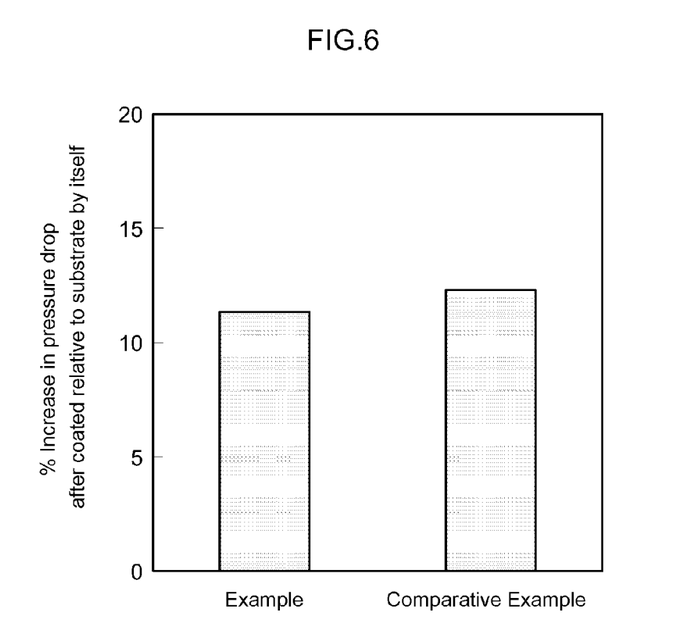
FIG. 6 shows a graph comparing rates of increases in pressure loss.

The resulting exhaust gas purification catalysts (Example, Comparative Example) were then installed in the exhaust pipe of gasoline engine and their pressure losss were compared. In particular, the exhaust gas purification catalysts were individually installed in the exhaust system on an engine bench and subjected to an endurance test carried out at 750° C. for 50 hours. The exhaust gas purification catalysts after the endurance test were then measured for pressure loss (kPa). As the standard, the substrate was also subjected by itself to a measurement of pressure loss (kPa). The results are shown in FIG. 6. In FIG. 6, with the substrate by itself being the standard, the % increase in pressure loss is shown relative to the standard.

As shown in FIG. 6, in view of the pressure loss, Example performed better than Comparative Example.

In summary, it has been found that according to the art disclosed herein, while the increase in pressure loss is reduced, the exhaust partition ability can be increased. These results indicate the technical significance of the present invention.

Specific embodiments of the present invention are described above, but these are merely for illustration and do not limit the scope of the claims. The art according to the claims include various modifications and changes made to the specific embodiments illustrated above.

For example, in the Example, downstream coating sections 28 were each formed of two layers, namely the first catalytic metal-free downstream coating subsections 281 and the second catalytic metal-containing downstream coating subsections 282. However, the invention is not limited to this. Downstream coating sections 28 can be formed, for instance, with a gradient of catalytic metal-carrying rate so that the amount of the catalytic metal gradually increases towards the surface layer. Alternatively, each downstream coating section 28 can be formed with three or more layers with stepwise-varying catalytic metal-carrying rates. In the Example, downstream coating sections 28 were formed in the interior of partition walls 12. However, the invention is not limited to this. Downstream coating sections 28 can be formed also on the surface of partition walls 12 or continuously from the surface through the interior of partition walls 12.

REFERENCE SIGNS LIST 1 honeycomb substrate
1a end
2 closed section
4 opening
6, 12 partition walls
10 exhaust gas purification catalyst
22 plug
24 entrance cells
24a exhaust inlet-side ends
25 exit cells
25a exhaust outlet-side ends
26 upstream coating sections
28 downstream coating sections
281 first downstream coating subsections
282 second downstream coating subsections

The invention claimed is:

1. A wall-flow type exhaust gas purification catalyst placed in an exhaust pipe of an internal combustion system to purify exhaust gas emitted from the internal combustion system, with the exhaust gas purification catalyst comprising:
a substrate that has a wall-flow structure and comprises an entrance cell whose exhaust inlet side has an open end as well as an exit cell whose exhaust outlet side has an open end wherein the cells are separated with porous partition wall comprising pores,
an upstream coating section formed in an internal portion of the partition wall facing the entrance cell, from the exhaust inlet-side end in the extending direction of the partition wall, and
a downstream coating section formed in an internal portion of the partition wall facing the exit cell, from the exhaust outlet-side end in the extending direction, having a length shorter than the entire length $L_w$ of the partition wall; wherein
the upstream coating section and the downstream coating section individually comprise a catalytic metal and a support carrying the catalytic metal,
in the downstream coating section, the catalytic metal is concentrated in the surface layer in contact with the exit cell, and the catalytic metal in the pores of the partition wall is at least 80 mass %, when the total amount of the catalytic metal in the downstream coating subsection is 100 mass %,
the downstream coating section is divided into two subsections in thickness direction vertical to the extending direction, namely first downstream coating subsection relatively close to the entrance cell and second downstream coating subsection relatively close to the exit cell,
the first downstream coating subsection being essentially free of the catalytic metal, and
the second downstream coating subsection comprising the catalytic metal.

2. The exhaust gas purification catalyst according to claim 1, wherein the downstream coating section has a length $L_D$ in the extending direction, equivalent to 10% or greater, but 50% or less of the $L_w$.

3. The exhaust gas purification catalyst according to claim 1, wherein the upstream coating section has a length $L_U$ in the extending direction, equivalent to 60% or greater, but 90% or less of the $L_w$.

4. The exhaust gas purification catalyst according to claim 1, wherein, in the extending direction, the upstream coating section and the downstream coating section partially overlap each other in the extending direction, and
the $L_w$, a length $L_U$ of the upstream coating section in the extending direction and a length $L_D$ of the downstream coating section in the extending direction satisfying the next inequality $L_w<(L_U+L_D)<2L_w$.

5. The exhaust gas purification catalyst according to claim 4, wherein the upstream coating section and the downstream coating section overlap each other over a length equivalent to 5% or greater, but 20% or less of the $L_w$.

6. The exhaust gas purification catalyst according to claim 1, wherein, in thickness direction vertical to the extending direction, the partition wall have an overall thickness $T_w$ and the downstream coating section has a thickness equivalent to 30% or less of the $T_w$.

7. The exhaust gas purification catalyst according to claim 1, wherein, in thickness direction vertical to the extending direction, the partition wall have an overall thickness $T_w$ and the upstream coating section has a thickness equivalent to 70% or more of the $T_w$.

8. The exhaust gas purification catalyst according to claim 1, wherein in the upstream coating section, the catalytic metal in the pores of the partition is at least 80 mass %, when the total amount of the catalytic metal in the upstream coating subsection is 100 mass %.

9. The exhaust gas purification catalyst according to claim 1, wherein the catalytic metal of the upstream coating section consists of at least one of rhodium, palladium, platinum, ruthenium, osmium, iridium, silver and gold.

10. The exhaust gas purification catalyst according to claim 1, wherein a gap in the thickness direction is provided between the upstream coating section and the second downstream coating section.

11. The exhaust gas purification catalyst according to claim 10, wherein, in the thickness direction, the partition wall has an overall thickness $T_w$ and a thickness of the gap is 2% or more and 20% or less of the $T_w$.

* * * * *